United States Patent
Jones et al.

(10) Patent No.: US 6,192,245 B1
(45) Date of Patent: *Feb. 20, 2001

(54) METHOD FOR DETERMINING HANDOVER IN A MULTICELLULAR COMMUNICATIONS SYSTEM

(75) Inventors: Philip Jones, Wootton Bassett; Howard Thomas, Cirencester; Keith Essam, Tetbury; Andrew Le Fleming, Etchilhampton Devizes, all of (GB)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/973,882
(22) PCT Filed: Jun. 28, 1996
(86) PCT No.: PCT/EP96/02831
§ 371 Date: Mar. 2, 1998
§ 102(e) Date: Mar. 2, 1998
(87) PCT Pub. No.: WO97/02716
PCT Pub. Date: Jan. 23, 1997

(30) Foreign Application Priority Data

Jul. 1, 1995 (GB) .................................................. 9513432

(51) Int. Cl.$^7$ ........................................................ H04Q 7/20
(52) U.S. Cl. .................... 455/437; 455/441; 455/444
(58) Field of Search ................................. 455/436, 437, 455/439, 443, 444, 438, 441

(56) References Cited

U.S. PATENT DOCUMENTS

| | | | |
|---|---|---|---|
| 5,379,446 | * | 1/1995 | Murase ................................ 455/444 |
| 5,392,453 | * | 2/1995 | Gudmundson et al. ............. 455/444 |
| 5,640,677 | * | 6/1997 | Karlsson ............................. 455/444 |
| 5,678,185 | * | 10/1997 | Chia ..................................... 455/436 |

* cited by examiner

Primary Examiner—Dwayne D. Bost
Assistant Examiner—Quochien B. Vuong
(74) Attorney, Agent, or Firm—Kenneth A. Haas

(57) ABSTRACT

A method for determining a handover for a mobile station (1) in a multicellular communication system having a serving cell (3), a plurality of neighboring cells (4,5), and at least one control cell where the cells include at least one macrocell (2) and a plurality of microcells. The method includes the steps of comparing the received signal of the control cell with a parameter value.

1 Claim, 2 Drawing Sheets

METHOD FOR DETERMINING HANDOVER IN A MULTICELLULAR COMMUNICATIONS SYSTEM

FIELD OF THE INVENTION

This invention relates in general to a method of determining handovers (or handoffs) in a multicellular communications system, and more particularly to determining handovers in a multicellular communications system based on a received signal from a control cell.

BACKGROUND TO THE INVENTION

In a cellular environment, at any one time, there is usually one serving cell defined as the cell with the base station that an active mobile station is receiving service from so that the mobile station may receive and transmit communication via the serving cell base station. There are a number of surrounding cells that are neighbouring cells. The serving. cell may also be referred to as the cell that the mobile unit is camped on to. In a multicellular environment, there may be cells of different sizes where a number of cells of similar size are located within one larger cell (umbrella cell). The smaller cells within the umbrella cell are called microcells. The umbrella cell may be referred to as a macrocell.

Microcells are created in a dense population of users to allow a greater capacity of users on the cellular system and improve spectral efficiency. The microcells facilitate the reuse of frequencies over a smaller distance. Thus, a mobile unit may be within a microcell as well as an umbrella cell.

Such a two tiered combined cell architecture includes an overlay macrocell layer, comprising of at least one macrocell and an underlay microcell layer, comprising of a plurality of microcells.

Cellular radio systems divide the area over which service is to be offered into a number of smaller areas called cells, each of which is served from its own base site, as previously mentioned. Each cell has its own antenna or antennas for transmission to and reception from the mobile station. An important principle of cellular radio is that frequencies in the system may be reused by several cells, provided that the geographic separation of the cells is sufficient to ensure that these common frequencies do not interfere with each other. This allows efficient use of the frequency spectrum available to the owner of the cellular system.

As a mobile moves from the service area of one cell into the service area of another, it must be instructed to communicate with the new cell and cease communication with the old cell. This process is known as "handover".

In mobile communication systems, the handover process relies on measurements made by the mobile station, the serving base station, or surrounding base stations. One important class of handovers, commonly referred to as "power budget handovers", involves making measurements on the radio link of the combination (mobile station and serving cell base station) in progress, supplemented by measurements which predict whether or not better quality would be enjoyed if the mobile were to be served by another base station. These supplementary measurements could be made by the mobile station on other base stations, or by the other base stations on the mobile station. In any event, when the measurements indicate that a better radio link would exist if the mobile were to handover to another base station, the handover to such base station is initiated.

As the traffic capacity requirements of multicellular radio network increase, cell sizes may be reduced to increase the density of traffic carrying channels per unit area within a fixed spectrum. However, users are diverse and some are better served by larger cells. Additionally, traffic density is not uniform and while some areas may require very small cells others do not. For these reasons, multi-cellular networks consisting of a variety of cells of different sizes arranged in layers superpositioned on top of one another as previously discussed have been proposed.

The speed and trajectory of a mobile and the size of a cell determine the time taken to traverse that cell. Thus, when cells in different layers are of different sized, the speed of the mobile becomes an important factor for determining which layer of cells a mobile would be best served by. What is important here is not the absolute speed but the speed measured in units of cells/unit time.

It is apparent, therefore, that optimum performance in such a network might best be achieved by segregating mobiles on the basis of speed as determined by the number of handovers they might suffer.

Mechanisms have been proposed which introduce a delay into the handover process so that mobiles travelling very fast with respect to the sizes of cell in the network layer by which they are being served, will prevented from staying in that layer. However, it is our view that this mechanism has serious disadvantages arising from the distortions to "best server" cell boundaries that it produces. In the extreme case this leads to the situation where a mobile will handover to a neighbouring microcell which it has already completely passed through. These distortions can lead to greater interference and an increased difficulty in planning a network.

Thus, there is a need for speed sensitive handover method which overcomes some of the main drawbacks of the simple delay based method.

SUMMARY OF THE INVENTION

According to the present invention, there is provided a method for determining handover for a mobile station in a multicellular communications system having a serving cell, a plurality of neighbouring cells and at least one control cell, where the cells comprise of at least one macrocell and a plurality of microcells, the method comprising the steps of measuring a received signal at the mobile station from the control cell, comparing the received signal from the control cell with a parameter value, and determining a handover based on the comparison.

DETAILED DESCRIPTION OF THE PREFERRED EMBODIMENT

Figure 1:
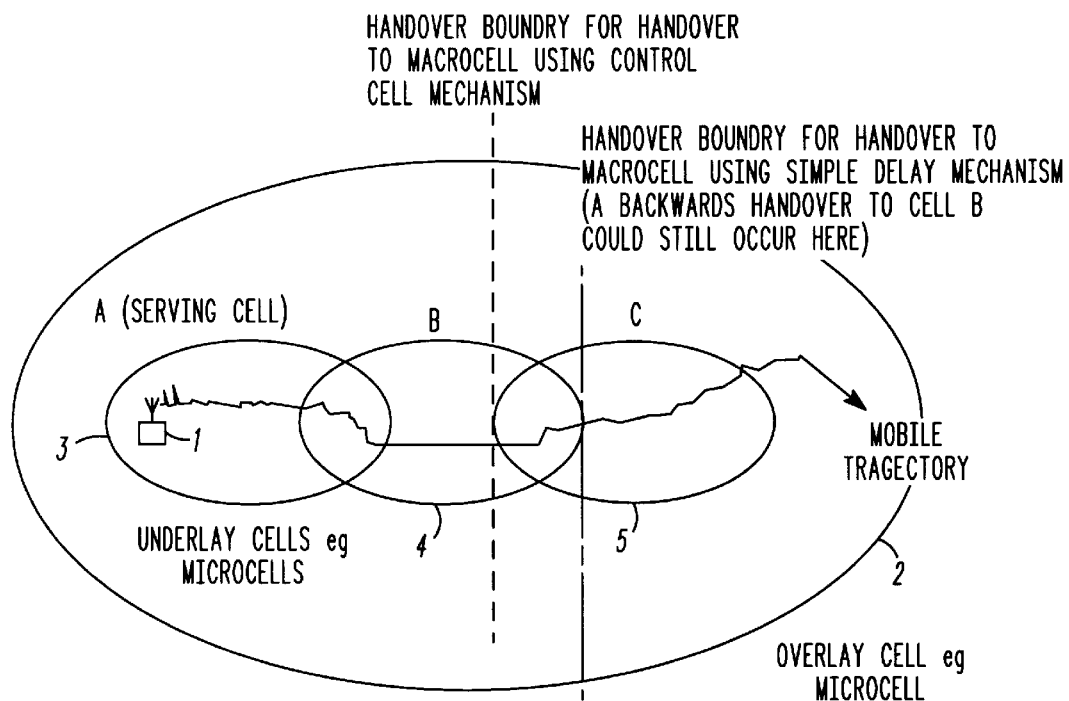
FIG. 1 illustrates an example of a multicellular environment.

Referring to FIG. 1, a multicellular (or microcellular) environment is shown comprising of at least one macrocell 2 (or umbrella cell) and a plurality of microcells 3–5. Each cell includes a base station (not shown) typically located near the geographic centre of the cell. A base station typically determines the size and capacity of the cell. A communication system may include different sized cells as well as a mobile station 1 which may be receiving service from either a base station of the macrocell 2 or a base station of one of the microcells 3. Receiving service from a particular base station in terms of being able to receive and transmit calls is also referred to as being camped on that particular base station.

Neighbouring cells are cells that a mobile station monitors for handover purposes and are usually overlapping or next to the serving cell coverage area. For example, in FIG. 1, if the mobile station 1 is being served be the microcell 3, its neighbouring cells would be at least the macrocell 2 and microcell 4.

The present invention adds a set of "control" neighbours (control cells) to the list of neighbours that a mobile station is requested to monitor for handover purposes. These control cells may lie beyond the actual planned neighbours of the cell providing service to the mobile. Thus, microcell 5 could be a control cell to the mobile station 1 in microcell 3.

The present invention provides a method for determining a handover for the mobile station in a multicellular communications system having a serving cell 1, neighbouring cells 2, 4, and at least one control cell 5, where the cells comprise of at least one macrocell 2 and a plurality of microcells 3–5. The method includes the steps of measuring a received signal at the mobile station 1 from the control cell 5, comparing the received signal from the control cell 5 with a parameter value and determining a handover based on the comparison.

The parameter value may be a received signal from a target cell 4.

An alternative embodiment of the present invention comprises the steps of determining a target cell 4 from the list of neighbouring cells, measuring a received signal at the mobile station from the target cell 4, measuring a received signal at the mobile station from the control cell 5, comparing the received signal from the control cell 5 with the received signal from the target cell 4 and determining a handover based on the comparison. The target cell is the neighbouring cell that may be the next likely cell for handover.

A further embodiment includes delaying a handover to the target cell until the step of determining a handover based on the comparison is completed. However, such a delay mechanism need only be sufficient to displace the mobile station such that the delayed handover candidate no-longer meets some relative criterion with respect to the control neighbour rather than having to meet some absolute criterion for Rxlev or Rxqual. The delay mechanism eliminates the case where handover occurs to a neighbour cell that has already been passed through.

In the case where comparison with the signal strength of the control cell indicates that hangover to the delayed neighbour is no-longer the best option, due most probably to the relatively fast speed of the mobile with respect to the sized of cell in its current layer, handover to a cell in the next layer up (i.e. macrocell) would be the preferred option.

Figure 2:
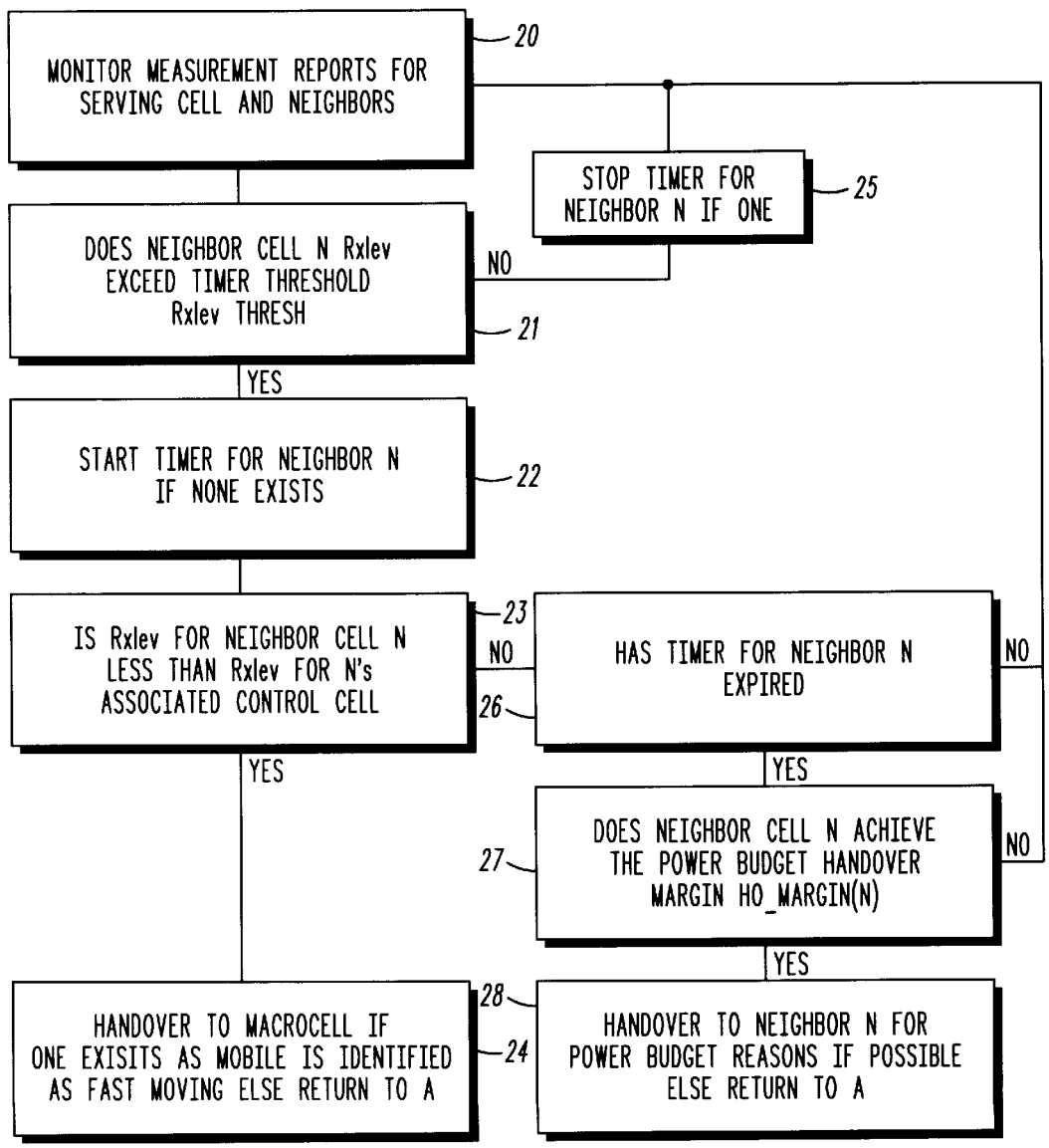
FIG. 2 is a flow chart for a method according to an embodiment of the present invention.

Specifically, one possible embodiment of the present invention is described in reference to FIG. 2.

In step 20 the mobile station 1 monitors measurement reports for the serving cell 3 and neighbour cells 4, 2 (see FIG. 1). When a mobile station 1 served by microcell 3 detects that a neighbour cell 4 is being received at a power which exceeds a threshold, as in step 21, it starts a timer, step 22. While the timer is running the signal received from the neighbour cell 4 is compared with a signal received from a control cell 5, step 23. If the power received from control cell 5 is greater than that received from neighbour cell 4 (target cell) it may be determined that the mobile station 1 is fast moving and that handover to the macro cell layer should be effected, step 24. Handover to a macrocell 2 could be effected as soon as the condition is detected or when the timer expires and the condition that the control cell power exceeds the target cell power is found to be true.

If the received signal from the target cell is greater than the received signal from the control cell then it is determined whether the timer has expired or not as in step 26. If the timer has expired the monitoring process is repeated. If the timer has not expired it is determined in step 27 whether the target cell achieves a power budget handover, if yes, the mobile station is handed over to the target cell as in step 28, if not the monitoring process is repeated.

The present invention should be able to reduce cell boundary skewing as vehicle speeds increase as the condition that a mobile is moving "fast" is detected at an earlier stage than would be possible using a simple delay mechanism.

In a simple delay mechanism of prior art, cell skew is unavoidable and furthermore, handover to a target cell can still sometimes occur when the mobile has already passed through the cell.

Not shown in the FIGs., for simplicity, is the parallel handover mechanism following the standard GSM Recommendation. Thus, handover for other reasons such as Rxlev or Rxqual etc. is still possible and such handover causes can be generated in parallel to the method shown in the present invention.

The present invention describes a method for determining handover in a multicellular system that is indirectly sensitive to the rate at which a mobile crosses cell boundaries. As described above, a communications system using the method of the present invention includes a number of neighbour cells that the mobile station monitors for handover purposes, at least one associated control cell that is monitored in conjunction with the possible handover candidate neighbours (target cells) from the neighbour cells, a mechanism for comparing the signal levels in the target cells and the control cells with thresholds and timer values, a mechanism based on the comparison for determining whether handover should occur and whether the preferred handover candidate should be in the current layer of the network or to a cell in a layer above consisting of larger cells.

An embodiment of the present system includes where the strength of the serving cell is also taken into account in determining the handover and/or any other parameter of the serving cell such as Rxqual is taken into account.

An alternative embodiment of the present invention includes a modification of the handover method in order to instruct (after the radio link measurements have determined that a better radio link would exist on another base station) the mobile to handover to a different base station. The target base station for handover is specified as a function of the results of the radio link measurement. The difference to conventional handover algorithms is that here, the target base station is freely specified—it is not necessarily the one that offers the best radio link according to the measurements.

The advantage of such an alternative is that there are cases in which the measurements made in the handover process can lead to wrong conclusions about the choice of target base station. Specification of a different base station can avoid these problems. An example is described below.

The GSM standard is a technical standard for cellular radio systems based on TDMA (Time Division Multiple Access) technology. In GSM systems, measurements made for the handover process are of 2 types:

a) Measurements made by the mobile station on the serving base station and other neighbour base stations; and b) Measurements made by the serving base station on the mobile station.

The mobile station makes signal strength measurements on the serving cell base station and surrounding base stations and transmits the results of these measurements back to the serving cell base station. The mobile station also makes measurements of the quality of the existing radio link. This quality measurement is related to the bit error rate of the link.

The serving cell base station makes measurements of the signal strength of the mobile station, and of the quality of the radio link. It also measures the timing advance currently used by the mobile station (this timing advance is used to compensate for the propagation delay between the mobile station and the base station. Application of the correct value of timing advance keeps the transmissions from the mobile station within the receive timeslot window defined by the base station).

Whatever the criterion used to trigger the handover, conventional handovers are made to the base station with the highest power budget. The power budget for a potential target base station is essentially the expression:

signal strength (target base station)−signal strength (current serving base station)+compensatory factors.

Figure 3:
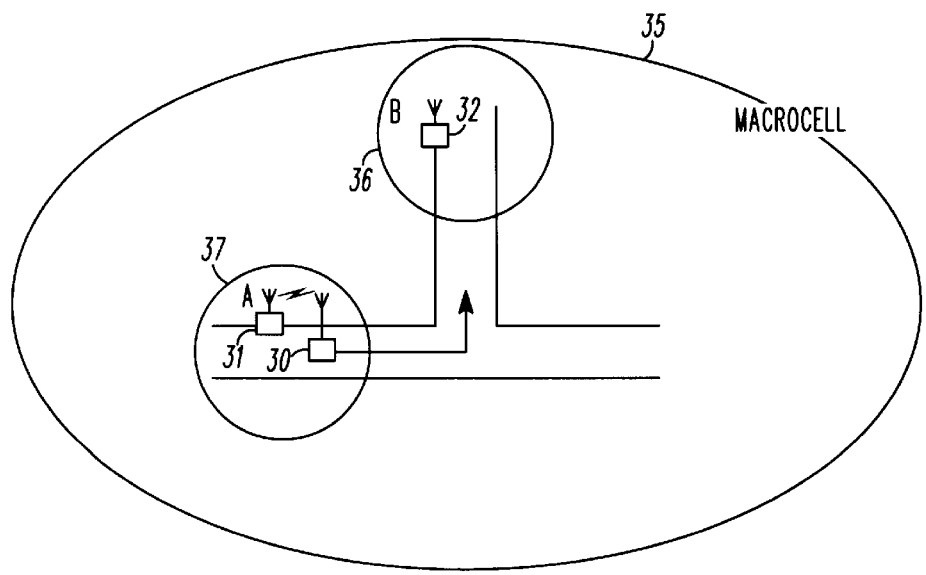
FIG. 3 illustrates a further embodiment of the present invention.

The compensatory factors include factors such as the maximum mobile transmit power allowed in the cell, and are included to take into account the cases where cells of different sized are juxtaposed. The problem is that the base station with the highest power budget is not necessarily the best. For example, microcellular systems are high capacity cellular systems where antennas are mounted below roof height. Propagation in such systems is essentially limited to along streets. Such systems typically employ larger overlaid macrocells in order to fill in coverage holes and handle fast moving mobiles. It is often the case that frequency spectrum available in a microcellular system is limited and consequently it becomes impossible to avoid cases where adjacent frequencies are employed in adjacent cells. If these cells are round the corner from each other then the case illustrated in FIG. 3 can occur. Here, the mobile station 30 is turning the corner in direction of microcell 36 having base station 32. The mobile station 30 is currently on microcell 37 having base station 31 operating on frequency f1. Microcell 36 uses frequency f2, which is adjacent to frequency f1.

Conventional power budget handover does not work well in this situation. Conventional power budget handover is triggered when power budget>HO_MARGIN.

HO_MARGIN is a constant fixed for each neighbour cell.

On turning the corner, the signal from microcell 37 base station 31 drops rapidly and the signal from microcell 36 base station 32 rises rapidly. The problems which occur in this situation fall into two main classes:

(1) Before the handover occurs. The handover must be triggered before the signal from microcell 36 base station 32 exceeds that from microcell 37 base station 31 by about 9 dB. Once the signal from base station 32 exceeds that of the serving cell base station 31 by more than this value, the serving cell becomes noisy and in the worst case the handover command will not be received correctly. The rapid signal changes near the corner make this difficult to achieve.

This could be solved by setting the HO_MARGIN for neighbour cell 36 negative. Unfortunately, this has the consequence of causing the second type of problem:

(2) After the handover occurs If a negative HO_MARGIN is used, then when the mobile arrives on microcell 36, it will see the signal from microcell 37 as an interferer, at a level greater than microcell 36 and hence potentially causing degradation.

The alternative embodiment of the invention gets us out of this situation by allowing handover to be triggered using a negative HO_MARGIN and hence avoiding problems of type 1. However, handover is now to a completely different cell (the macrocell 35) and hence the problem of type 2 is also avoided. Handover can then occur down from the macrocell when the mobile is sufficiently inside the coverage area of cell 36 to avoid the adjacent channel interference.

Thus, an alternative to the present invention teaches a cellular or mobile base station which triggers a handover request when the power budget expression for a neighbour cell exceeds a given threshold. The handover is then executed to a cell which may be different from the cell which triggered the request. This target cell may not have to satisfy any measurement criterion.

The signal strength measurements on the target cell may have to exceed a given threshold before a handover to the target can occur.

The present invention relates to a mechanism for handover in a hierarchical cellular radio system employing some mechanism for mobile assisted handover based on an indirect speed detection technique. The basis of the technique is to delay a handover to neighbour for a given period and, when that timer expires, to determine whether handover to that neighbour should be conducted by comparing the signal strength of that neighbour with that from a further out cell which is not used as a neighbour for handover purposes. Alternatively, a handover may be made to another cell, control cell or target cell, that did not trigger the handover.

What is claimed is:

1. A method for determining handover for a mobile station in a multicellular communications system comprising at least one macrocell and a plurality of microcells and including a serving cell, at least one handover target cell and at least one control cell not being a handover target cell or the serving cell, the method comprising the steps of:

(a) determining a handover target cell from the at least one handover target cells;

(b) determining a control cell from the at least one control cells;

(c) measuring a received signal strength at the mobile station from the handover target cell;

d) comparing the received signal strength of the handover target cell with a threshold and when the threshold is exceeded;

(e) setting a timer to expire at the end of time period T;

(f) measuring a received signal strength at the mobile station from the control cell;

(g) comparing the received signal strength from the control cell with the received signal strength from the handover target cell during time period T; and (h) if the strength of the received signal from the control cell exceeds that received from the target cell, effecting a handover to a macrocell, (i) if the strength of the signal received from the control cell does not exceed that from the target cell, repeating steps (a) to (g).

* * * * *